US 8,689,069 B2

(12) United States Patent
Krenz-Baath et al.

(10) Patent No.: US 8,689,069 B2
(45) Date of Patent: Apr. 1, 2014

(54) MULTI-TARGETING BOOLEAN SATISFIABILITY-BASED TEST PATTERN GENERATION

(75) Inventors: Rene Krenz-Baath, Hamm (DE); Andreas Glowatz, Heidenau (DE); Friedrich Hapke, Winsen (DE)

(73) Assignee: Mentor Graphics Corporation, Wilsonville, OR (US)

( * ) Notice: Subject to any disclaimer, the term of this patent is extended or adjusted under 35 U.S.C. 154(b) by 294 days.

(21) Appl. No.: 13/157,237

(22) Filed: Jun. 9, 2011

(65) Prior Publication Data

US 2012/0317454 A1   Dec. 13, 2012

(51) Int. Cl.
*G06F 11/00* (2006.01)
*G06F 17/50* (2006.01)
*G06F 9/45* (2006.01)

(52) U.S. Cl.
USPC ........... 714/739; 714/741; 716/100; 716/103; 716/106

(58) Field of Classification Search
USPC ............... 714/738, 739, 741, 742, 25, 32, 33; 716/50, 51, 52, 100, 101, 103, 106, 716/132, 136
See application file for complete search history.

(56) References Cited

U.S. PATENT DOCUMENTS

| | | | | |
|---|---|---|---|---|
| 6,301,687 | B1 * | 10/2001 | Jain et al. | 716/107 |
| 6,496,961 | B2 * | 12/2002 | Gupta et al. | 703/2 |
| 7,003,743 | B2 * | 2/2006 | Abadir et al. | 716/107 |
| 7,650,581 | B2 * | 1/2010 | Rahim et al. | 716/113 |

OTHER PUBLICATIONS

F. A. Aloul, et al., "Solution and Optimization of Systems of Pseudo-Boolean Constraints," IEEE Trans. on Computers, vol. 56, No. 10, 1415-1424, 2007.
Stephen Eggersglub and Rolf Drechsler, "Robust Algorithms for High Quality Test Pattern Generation Using Boolean Satisfiability," International Test Conference, 2010.

* cited by examiner

*Primary Examiner* — Christine Tu (57) ABSTRACT

Disclosed are representative examples of methods, apparatus, and systems for generating test patterns targeting multiple faults using Boolean Satisfiability (SAT)-based test pattern generation methods. A SAT instance is constructed based on the circuit design information and a set of faults being targeted. A SAT solving engine is applied to the SAT instance to search for a test pattern for detecting the set of faults. The SAT instance or the SAT solving engine may be modified so that the SAT solving engine will search for a test pattern for detecting a maximum number of faults in the set of faults.

14 Claims, 8 Drawing Sheets

MULTI-TARGETING BOOLEAN SATISFIABILITY-BASED TEST PATTERN GENERATION

FIELD OF THE INVENTION

The present invention relates to the field of testing integrated circuits. Various aspects of the invention may be particularly useful for generating test patterns targeting multiple faults.

BACKGROUND OF THE INVENTION

The manufacturing process of today's integrated circuit (IC) design is very susceptible to defects. Each manufactured IC chip has to be subjected to a post-production test. Automatic test pattern generation (ATPG) systems test a chip by generating input assignments or test patterns that cause the outputs to be different if the chip is defective than if it is defect free. Traditional ATPG systems apply structural methods to generate test patterns. The structural methods use a data structure, such as a netlist, representing a circuit under test. To generate a test pattern, they assign values that cause a discrepancy at a faulted line (fault site) and then search for consistent values for all circuit lines such that the discrepancy is visible at a circuit output. Some notable structural methods are D-algorithm and FAN.

While widely being used, these structural methods have problems to cope with some hard-to-detect faults in today's complex circuit designs. The industry's demand for high fault coverage led to a renewed interest in nonstructural methods. Instead of performing a search on a data structure representing a circuit, some nonstructural methods, such as algebra methods, produce one or more equations describing all possible tests for a particular fault and then solve the resulting equation. One category of nonstructural methods are Boolean Satisfiability (SAT)-based methods. The SAT-based methods work on a Boolean formula in conjunctive normal form (CNF). The ATPG problem is transformed into a Boolean formula (or a SAT instance) first. Then, a SAT solver is used to solve the SAT instance. Many traditional SAT solvers are based on the original Davis-Putnam-Logemann-Loveland (DPLL) backtrack search algorithm. The algorithm performs a search process that traverses the space of $2^n$ variable assignment until a satisfying assignment is found (the SAT instance is satisfiable) or all combinations have been exhausted (the SAT instance is unsatisfiable). A test pattern can be derived readily from the satisfying assignment.

Common to all ATPG methods is the preference of small test pattern sets. Small test pattern sets are important for reducing test storage requirements and test application time. Test compaction techniques are usually applied to reduce the size of test pattern sets. These techniques can be classified as static and dynamic. Static compaction techniques are applied to test pattern sets already generated to further reduce them. For example, reverse order fault simulation is usually used in a test generation procedure to drop test patterns that detect faults that are also detected by test patterns generated later in the test generation process. A more sophisticated static compaction method merges compatible test patterns into a single test pattern. Static compaction may also be enhanced by modifying bits in certain test patterns such that they would detect faults detected by other test patterns. The latter test patterns can then be removed from the test set without affecting the fault coverage. Dynamic compaction techniques are integrated into the test generation process, generally attempting to generate test patterns such that each one detects a large number of faults. For example, some dynamic compaction methods use unspecified input values in a test pattern for a given target fault to detect additional target faults. The same test pattern is thus evolved until no unspecified bits remain, or additional faults cannot be detected. These techniques are often dependent upon the fault ordering and are computationally intensive. Heuristics may be used to improve them. Some techniques combined static and dynamic method to generate compact test pattern sets.

Figure 3:
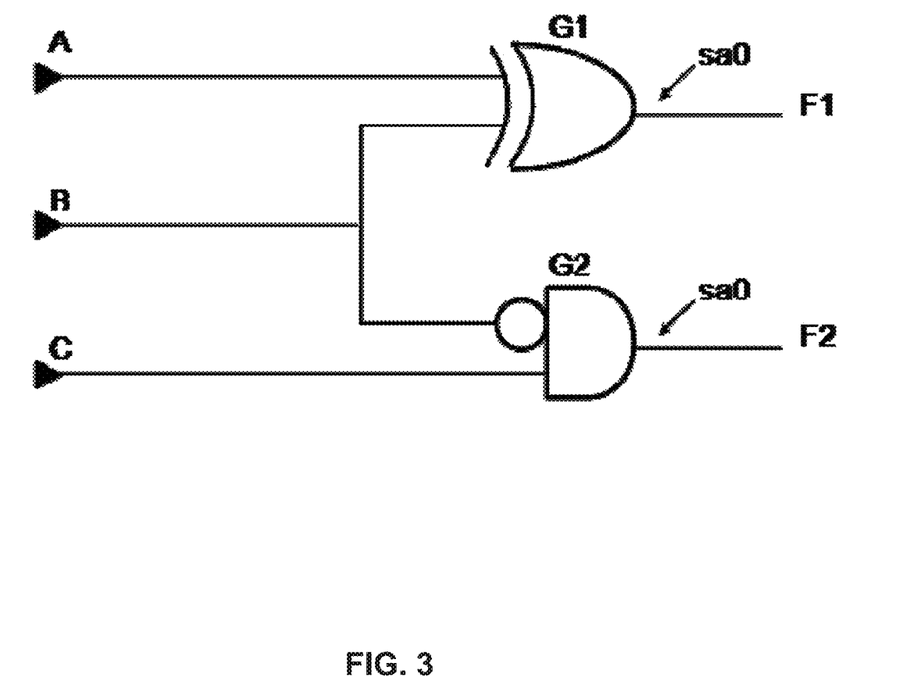
FIG. 3 illustrates a schematic block diagram of a circuit that explains some limitations of traditional test compaction techniques.

Whether static, dynamic, or combined, traditional test compaction techniques usually use the input assignments (specified bits of a test pattern) for probing a fault as a constraint for compaction even if alternative assignments can be found and used for compaction. This may prevent minimal test sets from being found in some cases, and limit the effectiveness of the compaction techniques. FIG. 3 illustrates an example that explains the limitation. There are two faults in this example: F1 and F2 are two stuck-at 0 at the outputs of the gate G1 and G2, respectively. G1 is an XOR gate and G2 is an AND gate. To detect F1, it is sufficient to assign input A to 0 and input B to 1. However, a test pattern including this input assignment cannot detect F2 as the output of G2 would always be 0 no matter whether F2 is present in the circuit or not. On the other hand, F1 can also be probed by assigning input A and input B to 1 and 0, respectively. Under this input assignment, F2 can be probed simultaneously with F1 by assigning input C to 1. Therefore, if an ATPG system happens to derive a test vector with input assignment A=0 and B=1 first, it would be very difficult if not impossible for traditional test compaction techniques to generate a single test pattern for detecting both F1 and F2.

BRIEF SUMMARY OF THE INVENTION

Disclosed are representative examples of methods, apparatus, and systems for generating test patterns targeting multiple faults using SAT-based ATPG methods. According to various embodiments of the invention, a SAT instance is constructed based on the circuit design information and the set of faults being targeted. The circuit design information may comprise a circuit netlist. A SAT solving engine is applied to the SAT instance. If a satisfying assignment is found, a test pattern will be derived based on the satisfying assignment.

With various implementations of the invention, a cost function may be incorporated into the SAT instance. A pseudo-Boolean constraint may be to formulate the cost function. The cost function causes the SAT solving engine to search for an assignment that can be converted to a test pattern for detecting a maximum number of faults in the set of faults. Alternatively, the SAT solving engine may be modified directly to handle the cost function. The test pattern generation process involving a cost function may be repeated for deriving a set of test patterns. After each run, faults in the set of faults that can be detected by the new test pattern will be removed. The whole process will terminate after either no faults are left in the set or no test pattern can be found to detect the faults left in the set.

Multi-targeting SAT-based ATPG methods can be applied along with other ATPG methods. With some implementations of the invention, a traditional ATPG method may be applied to an original set of faults. The faults that cannot be compacted sufficiently by the traditional ATPG method will be treated by a multi-targeting SAT-based ATPG method.

DETAILED DESCRIPTION OF THE INVENTION

General Considerations

Various aspects of the present invention relate to generating test patterns that target multiple faults using SAT-based ATPG techniques. In the following description, numerous details are set forth for the purpose of explanation. However, one of ordinary skill in the art will realize that the invention may be practiced without the use of these specific details. In other instances, well-known features have not been described in details to avoid obscuring the present invention.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "construct" and "apply" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool (e.g., an automatic test pattern generation ("ATPG") tool). Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit.

Exemplary Operating Environment

The execution of various electronic design automation processes may be implemented using computer-executable software instructions executed by one or more programmable computing devices. Because these examples of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the invention.

Figure 1:
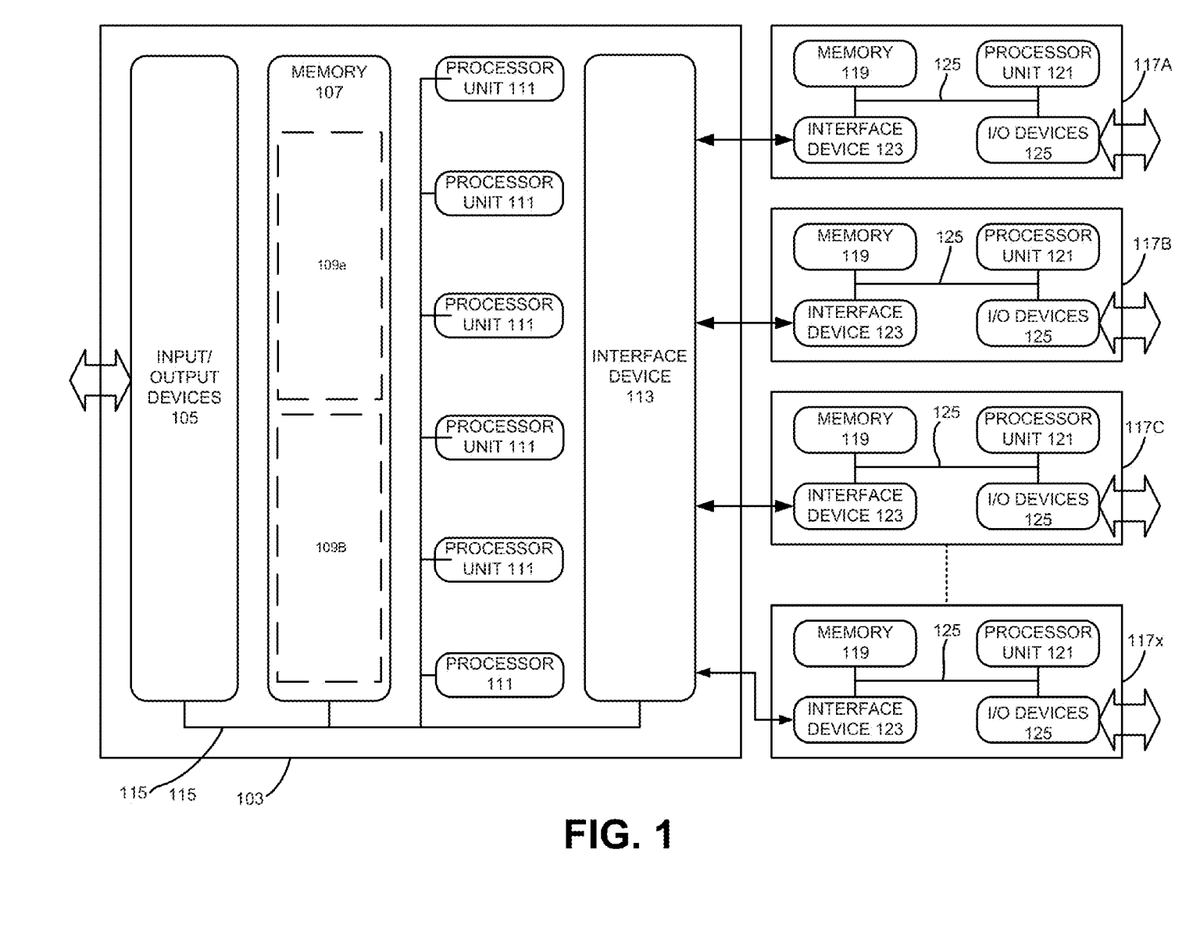
FIG. 1 illustrates an example of a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
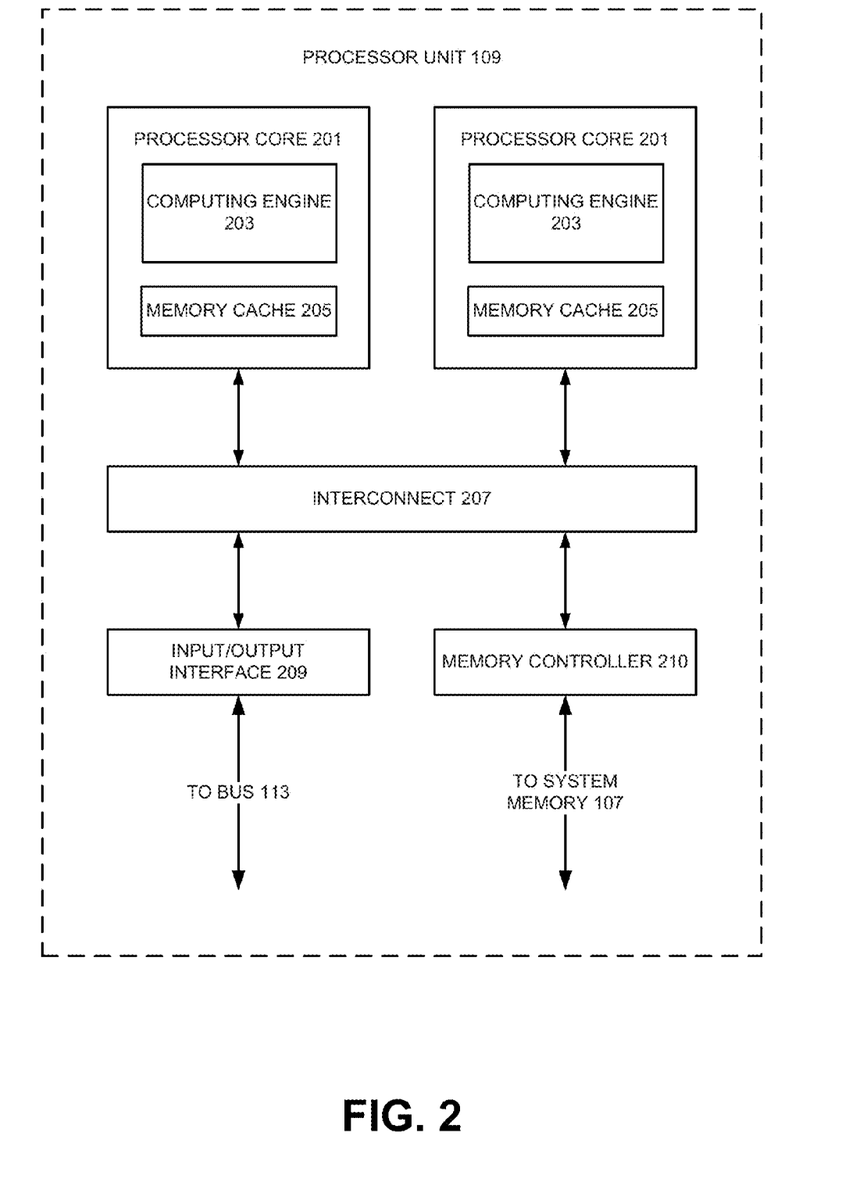
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 1157, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the invention may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 117 may alternately or additions be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Multi-Targeting SAT-Based ATPG Formulation

Figure 4:
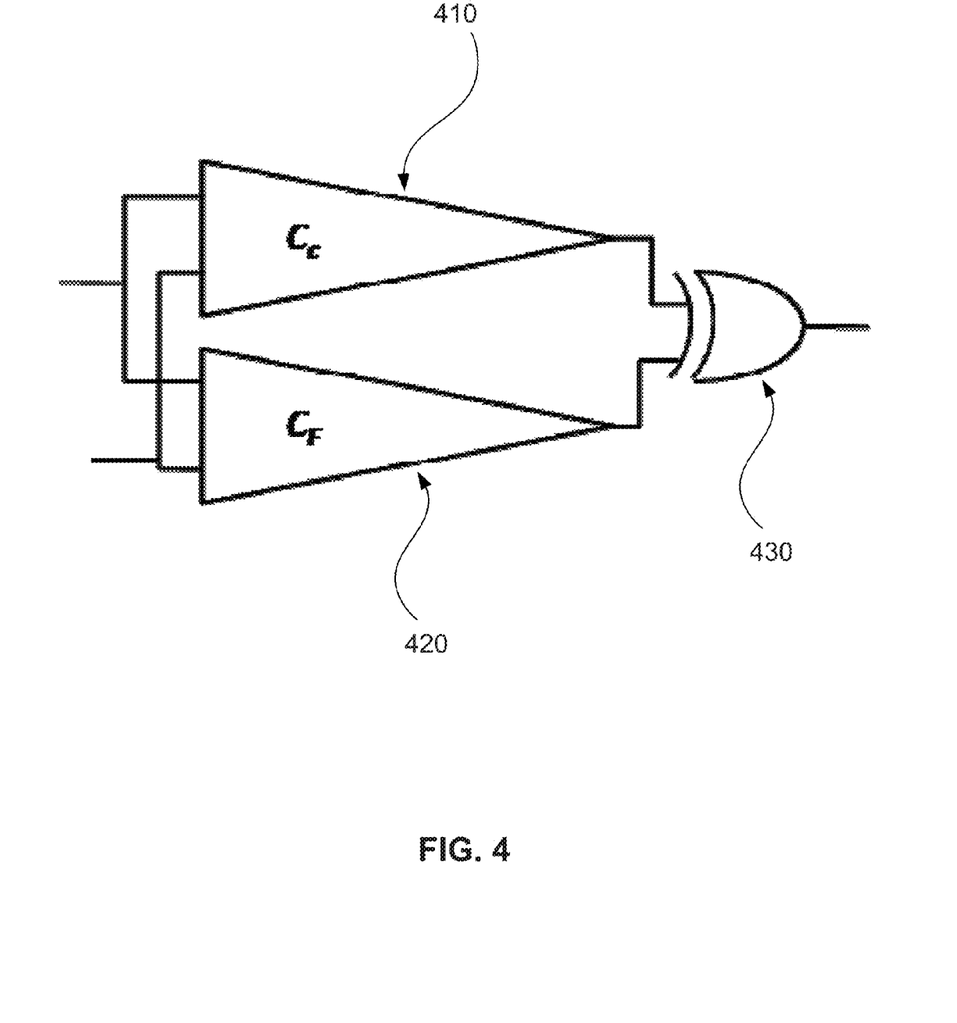
FIG. 4 illustrates an example of a Miter structure.

An ATPG problem may be defined using a circuit structure. FIG. 4 illustrates such a circuit structure. A fault-free circuit model $C_C$ 410 and a fault circuit model $C_F$ 420 are constructed according to the circuit design information of the circuit under test. The fault circuit model 420 contains a circuit component where a fault resides and the fault is what the ATPG problem targets. The inputs of the fault-free circuit model 410 are connected to the corresponding inputs of the circuit model 420. As such, the two circuit models share the same input signals. The two outputs of the circuit models 410 and 420 are coupled to the inputs of an XOR gate 430. For simplicity, only one XOR gate and one output for each circuit model are shown here. If there are several potential observation points (i.e. outputs), each potential observation point usually requires a separate XOR gate. To test for the fault, an assignment needs to be found that can cause at least one of these XOR gates to output a logical one (or a logical one at one or more outputs of the XOR gates can be justified by an assignment). The circuit structure illustrated in FIG. 4 is called a Miter structure.

As noted above, SAT-based ATPG systems work differently compared to classical structural ATPG systems. In SAT-based ATPG systems, an ATPG problem has to be transformed into a SAT instance first. Such a formulation process usually comprises two parts. First, the circuit parts that are to be transformed in CNF have to be identified. The starting point for identifying the circuit parts is, for example, the fault site. A depth-first search towards the outputs determines the output cone of the fault site. The output cone is the part of the circuit that could be influenced by the fault. Then the transitive fan-in cone of each output contained in the output cone is computed. The gates contained in this transitive fan-in cone need to be considered when creating the SAT instance for generating a test pattern for the fault at issue.

The identified circuit parts may then be used to construct a Miter structure which is in turn transformed into a SAT instance. An SAT instance comprises a Boolean formula that is a conjunction of n clauses. Each clause is a disjunction of literals. A literal is a Boolean variable or its complement. To transform a circuit to a CNF formula, a Boolean variable is assigned to each connection in a circuit to be transformed. Each logic gate is then represented by a characteristic function of relevant Boolean variables (or a CNF). The CNF formula of the circuit is the conjunction of the CNFs for all the gates in the circuit. Once the CNF formula for each circuit model in the Miter structure and the XOR gate are derived, the SAT instance can be generated accordingly by transforming the whole Miter structure. It should be noted that simplification may be made during the process if the fault-free circuit model and the fault circuit model share identical circuit components—they do not need to be repeated in the SAT instance.

Figure 5:
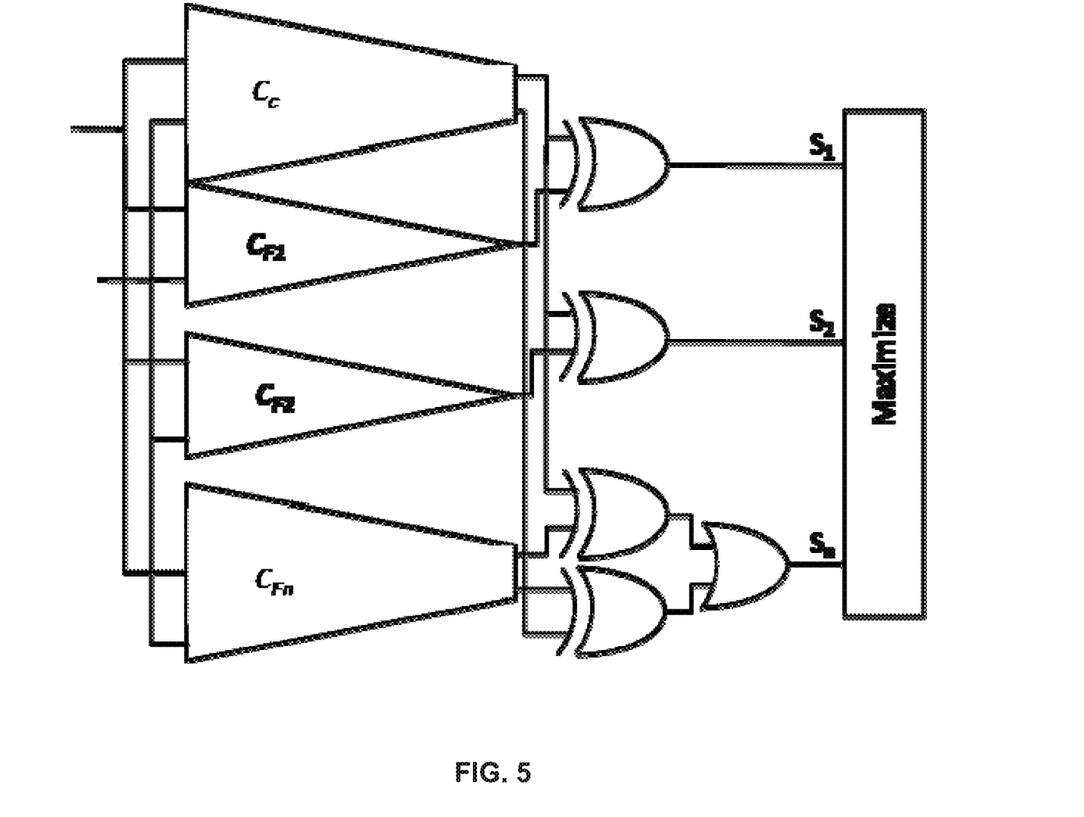
FIG. 5 illustrates an example of an extended Miter structure for multi-targeting SAT-based test pattern generation.

To generate test patterns targeting multiple faults using SAT-based ATPG techniques, the Miter structure needs to be expanded. FIG. 5 illustrates an example of an extended Miter structure for multi-target SAT-based ATPG. The extended Miter structure comprises a fault-free circuit model $C_C$, a set of fault circuit models $C_{F1}$-$C_{Fn}$ for a set of faults (F1-Fn) and a set of XOR gates. Each fault circuit model $C_F$ is associated with a particular fault. The inputs of each fault circuit model are connected to some or all of the corresponding inputs of the fault-free circuit model. The outputs of each fault circuit model and the fault-free circuit model are coupled to the inputs of the XOR gates. In this figure, one output for each of the fault circuit models $C_{F1}$ and $C_{F2}$ and two outputs for $C_{Fn}$ are shown for illustration purposes. If there exists a test pattern for detecting the set of faults F1-Fn, a satisfying assignment can be theoretically found that causes at least one of the XOR gates for each fault circuit model to output a logical one. To search for the satisfying assignment, various SAT solving engines may be applied to the SAT instance.

It should be noted that the Miter structure and the extended Miter structure also work for sequential circuits if the signals at the XOR gate outputs are logic one after the last time frame.

It should also be noted that a test pattern generated based on the above formulation may not, in some situations, detect two faults it targets if the two faults are present at a circuit simultaneously.

Multi-Targeting Pattern Generation Tool

Figure 6:
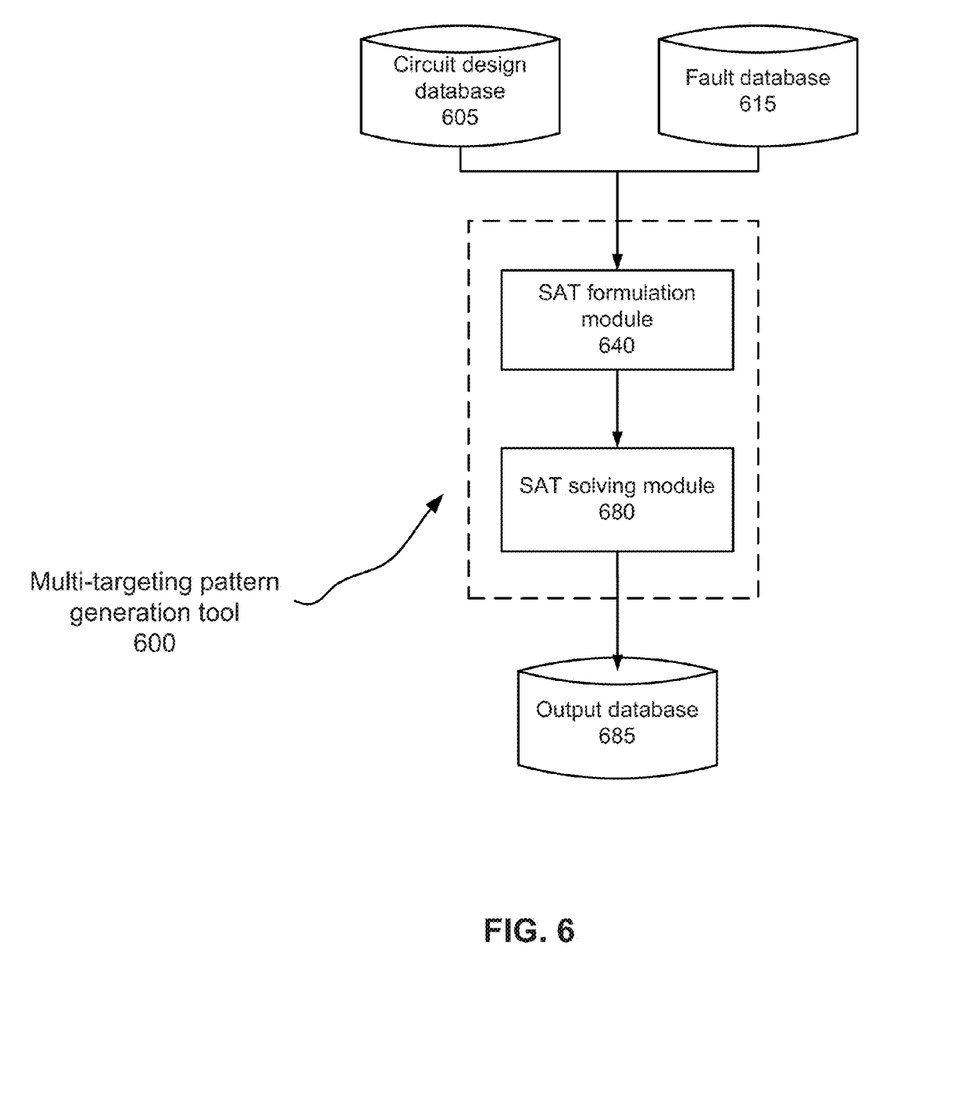
FIG. 6 illustrates an example of a multi-targeting pattern generation tool.

FIG. 6 illustrates an example of a multi-targeting pattern generation tool 600 that may be provided according to various embodiments of the invention. As seen in this figure, the multi-targeting pattern generation tool 600 includes a SAT formulation module 640 and a SAT solving module 680. As will be discussed in more detail below, some implementations of the multi-targeting pattern generation tool 600 may be employed with a circuit design database 605, a fault database 615 and an output database 685.

As previously noted, various embodiments of the invention may be embodied by a computing system, such as the computing system illustrated in FIG. 1 and FIG. 2. It should be appreciated that, while the SAT formulation module 640 and the SAT solving module 680 are shown as separate units in FIG. 6, a single computer (or a single processor in a computing system) may be used to implement both modules. Also, various examples of the invention may be embodied by software-executable instructions, stored on a computer-readable medium, for instructing a computing system to implement one or both components of each the SAT formulation module 640 and the SAT solving module 680. The computer-readable medium may be, for example, a magnetic storage device, an optical storage device, a "punched" surface type device, or a solid state storage device. Further, each module may either be fully automated or allow a user to provide instructions for an operation. Still further, while the circuit design database 605, the fault database 615 and the output database 685 are shown as separate units in FIG. 6, a single computer-readable medium may be used to implement two or all of these databases.

As will be discussed in more detail below, the SAT formulation module 640 is configured to construct a SAT instance based on circuit design information and a set of faults being targeted. The circuit design information and the set of faults may be stored in the circuit design database 605 and the fault database 615, respectively. With some implementations, the SAT formulation module 640 first generates an extended Miter structure using the circuit design information and the set of faults, and then transforms the extended Miter structure into a SAT instance.

The SAT solving module 680 is configured to apply a SAT solving engine to the constructed SAT instance. With some implementations, the SAT solving engine may derive a test pattern for detecting the set of faults from a satisfying assignment for the for the SAT instance if the SAT is satisfiable. The test pattern may be stored in the output database 685 and/or just displayed on a medium. The SAT instance may also be found not satisfiable. If that is the case, the SAT solving module 680 may output a report that no test pattern can be found for detecting all faults in the set. The outputting operation comprises storing the report in the output database 685 and/or displaying them on a medium.

With some other implementations, the SAT instance is constrained by a cost function such as the "Maximize" in FIG. 5 that causes the SAT solving machine to search for an assignment that can be converted to a test pattern for detecting a maximum number of faults in the set of faults rather than all of them directly. The cost function may be represented by a pseudo-Boolean constraint that can be incorporated into the SAT instance or be used to modify the SAT solving engine. After applying the SAT solving engine to the SAT instance, the SAT solving module 680 may output either a test pattern along with a list of faults in the set that can be detected by the test pattern, or a report that no test pattern can be found for any of the faults in the set. Again, the outputting operation comprises storing the results in the output database 685 and/or displaying them on a medium. With still some other implementations, the SAT solving engine itself is configured to either find a test pattern that can detect a maximum number of faults in the set of faults or handle the pseudo-Boolean constraint directly. This approach leads to the same results as the one incorporating the constraint to the SAT instance.

The multi-targeting pattern generation tool 600 may be used repeatedly in an iteration process. After each run during the iteration process, the multi-targeting pattern generation tool 600 may find a test pattern that can detect a plurality of faults (or maybe just one fault) and the plurality of faults are removed from the set of faults. The iteration process will terminate after either no faults are left in the set or no test pattern can be found to detect the faults left in the set. Thus, the iteration process can generate a test pattern set for the set of faults.

Figure 7:
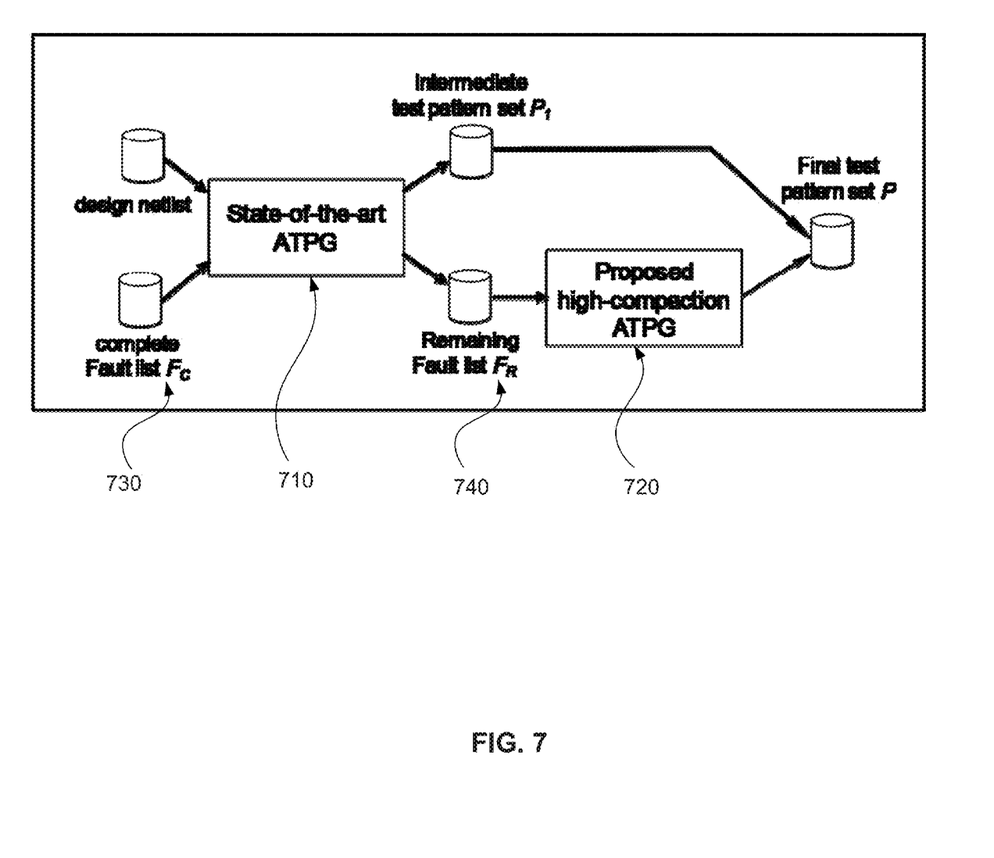
FIG. 7 illustrates an example of combining a multi-targeting SAT-based test pattern generation method with a traditional ATPG method.

The multi-targeting pattern generation tool 600 may also work along with a different ATPG tool. FIG. 7 illustrates an example of such a system. The original set of faults $F_C$ 730 is first treated by a state-of-the-art ATPG system 710. Faults that cannot be compacted sufficiently by the state-of-the-art ATPG system 710 will become the initial set of faults $F_R$ 740 to be processed by a proposed high-compaction ATPG system 720 implementing various features of the invention, such as, e.g. the multi-targeting pattern generation tool 600.

Faults Multi-Targeting SAT-Based ATPG Methods

Figure 8:
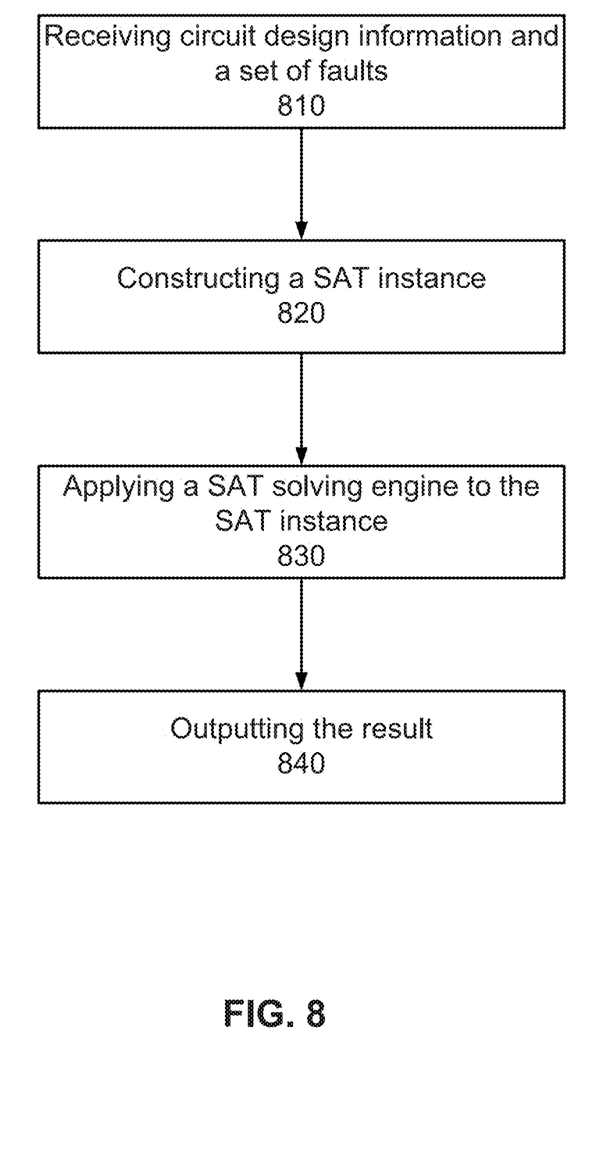
FIG. 8 illustrates a flowchart describing methods of multi-targeting SAT-based test pattern generation.

FIG. 8 illustrates multi-targeting SAT-based ATPG methods that may be employed according to various embodiments of the invention. For ease of understanding, these methods will be described with reference to the multi-targeting pattern generation tool 600 illustrated in FIG. 6. It should be appreciated, however, that alternate implementations of a multi-targeting pattern generation tool may be used to perform the multi-targeting SAT-based ATPG methods according to various embodiments of the invention shown in FIG. 8. Likewise, the multi-targeting pattern generation tool 600 may be employed to perform other multi-targeting SAT-based ATPG methods according to various embodiments of the invention.

Initially, in operation 810, the SAT formulation module 640 receives circuit design information for a circuit and a set of faults that model a plurality of potential defects in the circuit. The circuit design information may comprise a netlist for the circuit. The circuit design information may also be in a different form such as an implication graph. The set of faults may be untreated by any ATPG tools or be derived after an initial set of faults have been processed by either a traditional ATPG tool or the multi-targeting pattern generation tool 600.

Next, in operation 820, the SAT formulation module 640 constructs a SAT instance based on the circuit design information and the set of faults. The SAT instance represents the multi-targeting ATPG problem in CNF. Various approaches can be used to construct it. As noted previously, the SAT formulation module 640 may first build an extended Miter structure using the circuit design information and the set of faults. The extended Miter structure comprises a fault-free circuit model, a set of fault circuit models for the set of faults and a plurality of XOR gate models. The set of fault circuit models can be generated, for example, using the method described in the section of Multi-Targeting SAT-Based ATPG Formulation. Then the fault-free circuit model can be generated based on the generated fault circuit models. Once the extended Miter structure is built, it is transformed into CNF formulas. Alternatively, an empty SAT instance is created first. Next, a fault-free circuit model is transformed into a CNF and added to the SAT instance. Then, the fault circuit models for the set of faults, XOR gates and connections are transformed into CNFs and added to the SAT instance.

As noted previously, in some embodiments of the invention, a cost function such as the "Maximize" shown in FIG. 5 may be incorporated into the SAT instance. The cost function causes the SAT solving module 680 to search for an assignment that can be converted to a test pattern for detecting a maximum number of faults in the set of faults. A pseudo-Boolean constraint may be to formulate the cost function. The pseudo-Boolean constraint itself can be represented by a set of CNF clauses and added to the SAT instance.

In operation 830, the SAT solving module 680 applies a SAT solving engine to the constructed SAT instance. Various SAT solving improvements may be incorporated into the SAT solving engine. For example, heuristics may be utilized to improve the performance of the SAT solving engine. Many SAT solvers can learn in form of conflict clauses and record them accordingly to prevent the future occurrence of the same conflicts. Random restarts can be used to help extricate the SAT solving engine from a "bad" region of the search space because of the sequence of decision assignments it had made.

If the SAT solving engine determines that the SAT instance is satisfiable, i.e. an assignment can be found that satisfies the SAT instance, a test pattern for detecting the set of the faults can be generated readily from the satisfying assignment by the SAT solving module 680. Otherwise, no test pattern can be obtained by the multi-targeting pattern generation tool 600.

As discussed above, the pseudo-Boolean constraint representing a cost function may be added to the SAT instance. In such a case, the pseudo-Boolean constraint will cause the SAT solving engine to search for an assignment that can be converted to a test pattern for detecting a maximum number of faults in the fault list. Instead of incorporating the cost function into the SAT instance, the SAT solving engine may be modified to handle the cost function directly. For example, some form of branch-and-around around the SAT engine may be used and the search space is pruned with best estimates of the maximum number. Another way to modify the SAT solving engine is to treat the cost function as an auxiliary pseudo-Boolean constraint with an adjustable right-hand side, or goal. Starting with an easy-to-satisfy goal, a sequence of SAT instances, each with a successively tighter goal, is then constructed and solved. The process continues until an unsatisfiable instance is encountered, indicating that the optimal value has been converged, namely, the goal reached in the last satisfiable instance.

In operation 840, the SAT solving module 680 outputs either a test pattern based on an satisfying assignment derived from solving the SAT instance or a report that a test pattern cannot be found. The outputting operation comprises storing in a computer-readable medium and/or displaying on a medium.

The above operations may be employed in a while-loop. After each run, a test pattern is generated and the faults in the set of faults that can be detected by the test pattern are identified and removed from the set of faults. The while-loop will terminate after either the set of faults becomes empty or contains only faults for which no test pattern can be generated by the multi-targeting pattern generation tool 600.

As previously noted, these operations can also be employed along with other ATPG approaches. For example, the set of faults are derived after applying a traditional ATPG method to an original set of faults and are determined to be those that cannot be compacted sufficiently by the traditional ATPG method.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. We therefore claim as our invention all that comes within the scope and spirit of these claims.

What is claimed is:

1. A method of multi-target Boolean Satisfiability (SAT)-based pattern generation, comprising:
   receiving circuit design information for a circuit and a set of faults that model a plurality of potential defects in the circuit;
   constructing a SAT instance based on the circuit design information and the set of faults;
   applying a SAT solving engine to the SAT instance to derive a satisfying assignment; and
   outputting a test pattern based on the satisfying assignment or a report that a test pattern cannot be generated.

2. The method recited in claim 1, wherein the circuit design information comprises netlist information of the circuit.

3. The method recited in claim 1, wherein the test pattern is capable of detecting a maximum number of faults in the set of faults.

4. The method recited in claim 1, wherein the SAT solving engine is configured based on a pseudo-Boolean constraint, the pseudo-Boolean constraint causing the SAT solving engine to derive the satisfying assignment that is converted to the test pattern, the test pattern being capable of detecting a maximum number of faults in the set of faults.

5. The method recited in claim 1, wherein the constructing a SAT instance comprises:
   constructing an extended Milter structure derived based on the circuit design information and the set of faults; and
   transforming the extended Milter structure to the SAT instance.

6. The method recited in claim 1, wherein the constructing a SAT instance is further based on a pseudo-Boolean constraint, the pseudo-Boolean constraint maximizing causing the SAT solving engine to derive the satisfying assignment that is converted to the test pattern, the test pattern being capable of detecting a maximum number of faults in the set of faults.

7. The method recited in claim 1, wherein the set of faults are derived after applying a different ATPG method to an original set of faults.

8. A non-transitory processor-readable medium storing processor-executable instructions for causing one or more processors to perform a method of multi-target Boolean Satisfiability (SAT)-based pattern generation, the method comprising:
   receiving circuit design information for a circuit and a set of faults that model a plurality of potential defects in the circuit;
   constructing a SAT instance based on the circuit design information and the set of faults;
   applying a SAT solving engine to the SAT instance to derive a satisfying assignment; and
   outputting a test pattern based on the satisfying assignment or a report that a test pattern cannot be generated.

9. The non-transitory processor-readable medium recited in claim 8, wherein the circuit design information comprises netlist information of the circuit.

10. The non-transitory processor-readable medium recited in claim 8, wherein the test pattern is capable of detecting a maximum number of faults in the set of faults.

11. The non-transitory processor-readable medium recited in claim 8, wherein the SAT solving engine is configured based on a pseudo-Boolean constraint, the pseudo-Boolean constraint causing the SAT solving engine to derive the satisfying assignment that is converted to the test pattern, the test pattern being capable of detecting a maximum number of faults in the set of faults.

12. The non-transitory processor-readable medium recited in claim 8, wherein the constructing a SAT instance comprises:
   constructing an extended Milter structure derived based on the circuit design information and the set of faults; and
   transforming the extended Milter structure to the SAT instance.

13. The non-transitory processor-readable medium recited in claim 8, wherein the constructing a SAT instance is further based on a pseudo-Boolean constraint, the pseudo-Boolean constraint maximizing causing the SAT solving engine to derive the satisfying assignment that is converted to the test pattern, the test pattern being capable of detecting a maximum number of faults in the set of faults.

14. The non-transitory processor-readable medium recited in claim 8, wherein the set of faults are derived after applying a different ATPG method to an original set of faults.

* * * * *